J. MOHRHERR.
CATTLE POKE.
APPLICATION FILED FEB. 16, 1912.
1,034,816.
Patented Aug. 6, 1912.
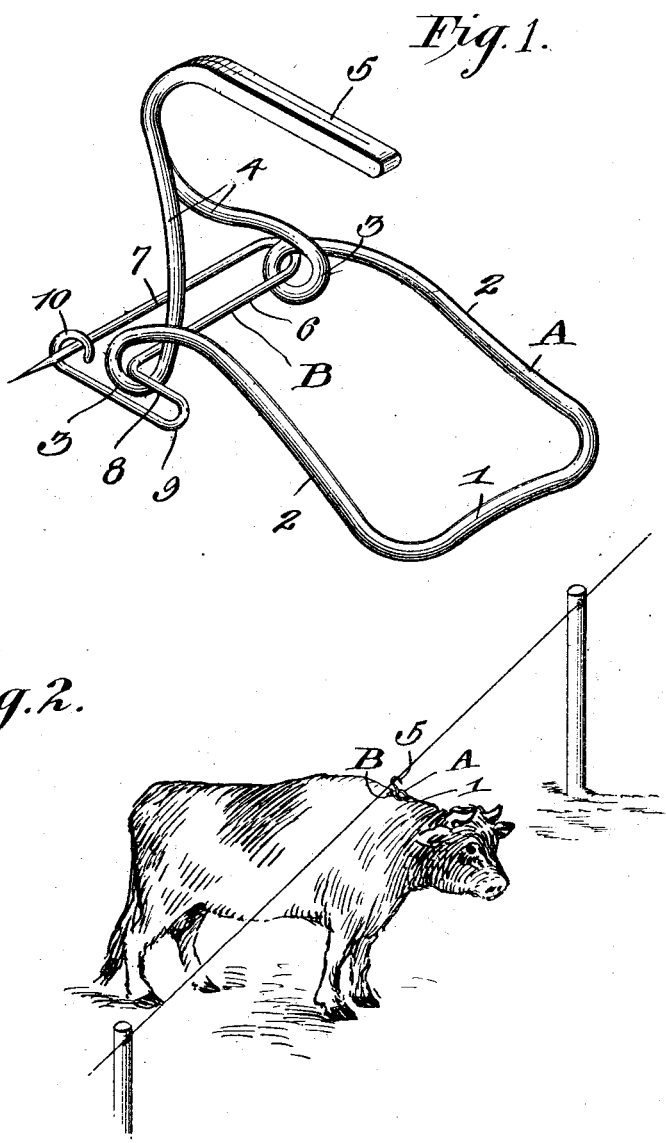

UNITED STATES PATENT OFFICE.

JOHN MOHRHERR, OF FAIRVIEW, MONTANA.

CATTLE-POKE.

1,034,816. Specification of Letters Patent. Patented Aug. 6, 1912.

Application filed February 16, 1912. Serial No. 678,151.

*To all whom it may concern:*

Be it known that I, JOHN MOHRHERR, a citizen of the United States, residing at Fairview, in the county of Dawson and State of Montana, have invented a new and useful Cattle-Poke, of which the following is a specification.

This invention comprehends certain new and useful improvements in cattle pokes of the type that are designed to be secured directly to the hide of the animal, and the invention has for its primary object a simple and efficient construction of device of this character which may be very easily made out of wire and which may be quickly and readily secured to the hide of the animal, preferably at the peak of the back just behind the shoulders, the device embodying a forwardly facing hook which is held properly in position projecting above the animal's back, whereby, when the animal attempts to pass underneath a wire fence, the line wire will be caught in the hook and thereby draw the hide and turn the animal back, the device, when used, enabling the inclosure to be effectually guarded with a minimum number of line wires, and in fact, only one line wire being necessary, provided it is not higher than the animal's back.

The invention also has for its object a simple device of this character which, while effective in preventing the animal from passing underneath a wire fence, will not interfere in any wise with the animal lying down or feeding and which will not cause the animal's back to become sore. And the invention also aims to generally improve devices of this class and to render them more useful and commercially desirable.

With these and other objects in view, as will more fully appear as the description proceeds, the invention consists in certain constructions, arrangements, and combinations of the parts that I shall hereinafter fully describe and claim.

For a full understanding of the invention, reference is to be had to the following description and accompanying drawing, in which, Figure 1 is a perspective view of my improved animal poke, and, Fig. 2 is a similar view showing the application of the device.

Corresponding and like parts are referred to in the following description and designated in the accompanying drawing by like reference characters.

My improved cattle poke is preferably formed of a single piece of suitable spring wire, the same being bent to form a counterbalancing bail A which consists of a preferably curved transversely extending rod 1 and two longitudinally extending curved rods 2 which are preferably disposed parallel to each other, as clearly illustrated in the drawing, and which terminate in eyes or coils 3, from whence the ends 4 of the wire converge upwardly slightly rearward and are welded or otherwise joined together to form a hook 5 the bill of which faces forward.

In connection with the above named parts, I use a fastening device B which is also preferably constructed of a single piece of wire bent to form a shank 6 which is returned upon itself at one end to form the penetrating member 7 and which is formed with a lateral offset 8 at its other end, said offset being returned upon itself, as at 9, and coiled to form a keeper 10 for engagement by the pointed penetrating member 7.

From the foregoing description in connection with the accompanying drawing, it will be understood that in the practical use of my improved cattle poke, a small portion of the skin or hide at a predetermined distance back from the shoulder of the animal is firmly grasped between the thumb and fingers and the penetrating member 7 with the fastening device B is passed through the animal's hide and into the keeper 10 after the fastening device has been passed through the eyes 3. It will, of course, be understood that the wire out of which the fastening device is formed, is relatively pliable, whereby it may be first passed through the eyes 3 and then bent back to form the penetrating member 7. When the device is thus secured to the hide of the animal, it is obvious that the bail A will rest upon the peak of the animal's back any determined distance behind the shoulders and will counterbalance and thereby hold the forwardly facing hook in an erect position, whereby it will catch in a line wire of a fence if the animal attempts to pass underneath the same and thereby draw upon the hide and prevent the animal from passing through the fence, while the device will not hinder the animal in any wise from feeding or lying down, as in the case of pokes of the type that are held in place by encircling the animal's neck.

While the accompanying drawing illustrates what I believe to be the preferred embodiment of my invention, it is to be understood that the invention is not limited thereto, but that various changes may be made in the constructions and arrangements of parts without departing from the scope of the invention, as defined in the appended claims.

What I claim is:—

1. A device of the character described, comprising a fastening device and a poke proper pivotally connected thereto and including a hook, and a counterbalancing bail connected thereto.

2. A device of the character described, including a fastening device and a poke proper embodying a bail, and a hook connected to the bail and angularly disposed relative thereto, the poke being provided with eyes through which the fastening device freely passes.

3. A device of the character described, including a fastening device adapted to be secured to the hide of an animal and a poke proper connected to said fastening device and consisting of a wire shaped to form a bail, consisting of a curved cross rod and laterally spaced longitudinal rods, eyes formed at one end of said longitudinal rods, the ends of the wire converging upwardly from said eyes and connected together to form a hook having a forwardly facing bill.

JOHN MOHRHERR.

Witnesses:
F. M. SCHAEFER,
E. E. CUSHING.

---

Copies of this patent may be obtained for five cents each, by addressing the "Commissioner of Patents, Washington, D. C."